United States Patent [19]

Campion

[11] Patent Number: 4,981,641

[45] Date of Patent: Jan. 1, 1991

[54] INHIBITION OF NUCLEAR-REACTOR COOLANT-CIRCUIT CONTAMINATION

[75] Inventor: Peter Campion, Poole, United Kingdom

[73] Assignee: United Kingdom Atomic Energy Authority, London, England

[21] Appl. No.: 284,675

[22] Filed: Dec. 15, 1988

[30] Foreign Application Priority Data

Dec. 23, 1987 [GB] United Kingdom ............... 8729980

[51] Int. Cl.$^5$ ............................................. G21C 19/30
[52] U.S. Cl. .................................................. 376/306
[58] Field of Search ............... 376/306, 305, 313, 310; 148/6.14 R; 427/5, 6, 380; 252/389.4, 389.41

[56] References Cited

U.S. PATENT DOCUMENTS

| | | | |
|---|---|---|---|
| 4,684,494 | 8/1987 | Dagard | 376/313 |
| 4,722,823 | 2/1988 | Honda et al. | 376/306 |
| 4,759,900 | 7/1988 | Peterson et al. | 376/306 |
| 4,764,337 | 8/1988 | Panson | 376/306 |
| 4,820,473 | 4/1989 | Ohashi et al. | 376/305 |

FOREIGN PATENT DOCUMENTS

| | | | |
|---|---|---|---|
| 0669974 | 9/1963 | Canada | 376/306 |
| 257465 | 3/1988 | European Pat. Off. | |
| 62-140099 | 6/1987 | Japan | 376/306 |

OTHER PUBLICATIONS

"Effect of Cooling and Oxidation at the Time of Shutdown in PWRs", Beslu et al., IAEA-SM-264/5, Nov. 1982.
"Radiation Field Control at LWRs", NEI, Nov. 1987, pp. 27-30.
"Getting to Grips with Water Chemistry and Corrosion", NEI, Mar. 1983, pp. 53-55.

Primary Examiner—Daniel D. Wasil
Attorney, Agent, or Firm—William R. Hinds

[57] ABSTRACT

A method of inhibiting or reducing contamination of out-of-core components of the primary coolant circuit of a pressurized water reactor due to absorption by oxide films of such components of cobalt and other radioactive contaminants generated by neutron irradiation of coolant impurities while in the reactor core. The method consisting of intermittently (e.g. at reactor shutdown for maintenance purposes), and/or once-off during commissioning of the reactor, holding the temperature of the circulating coolant within a suitable range below normal operating temperature for an extended period while maintaining its boric acid concentration substantially higher than during normal operation. Inhibition of absorpotion by component oxide films persists long-term and predisposes to preferential and improved removal of contamination by the usual purification equipment which operates continuously during normal operation of the reactor.

9 Claims, No Drawings

INHIBITION OF NUCLEAR-REACTOR COOLANT-CIRCUIT CONTAMINATION

This invention relates to the contamination of nuclear reactor coolant circuits by radionuclides, and to a method of inhibiting or reducing such contamination. In particular, the invention relates to the inhibition of radioactive contamination of out-of-core components of the primary coolant circuit of a pressurised light-water-cooled nuclear reactor (PWR).

In a PWR of well known kind, the primary coolant circuit, through which heat is removed from the reactor core, contains light water which serves both as coolant and as moderator and is circulated by a pump through the core (in which it absorbs heat) and then through the primary side of a tube-in-shell heat exchanger (in which the heat is transferred to a secondary system in which a separate supply of water is converted into steam) before being recirculated by the pump to the core. The primary circuit coolant water leaves the core at a temperature of about 320° C., and to prevent bulk boiling at that temperature it is maintained at high pressure by means of a pressuriser which also forms part of the primary coolant circuit or system. Commonly, in a modern PWR, the primary coolant circuit comprises four mutually parallel loops, each containing a respective pump which supplies coolant water to the reactor core and a respective heat exchanger through which heated coolant water from the core passes before being recirculated to the core by the respective pump; and in such a multi-loop circuit only a single pressuriser is required, fitted to one of the loops, since the core is common to all the loops and ensures pressure equalisation between them.

Excluding the Zircaloy fuel cladding, such a reactor primary coolant circuit can be taken, to a first approximation, as being composed of two materials which are exposed to the coolant water it contains, namely Inconel alloy for heat exchanger (steam generator) tubes and stainless steel 304L for the remainder of the circuit (the reactor vessel itself, steam generator channel heads, pump housings, connecting pipework etc). The coolant water reacts chemically with these materials, producing oxide films on the stainless steel and other alloy surfaces and releasing soluble metal impurities into the coolant water. The surface oxides become very complex since a number of mass transfer processes contribute to their formation. A dense, adherent oxide layer forms on the alloy surfaces (which has a beneficial inhibiting effect on corrosion rates) and a porous, non-inhibiting layer develops on top of the adherent layer. In addition to the oxidation of the alloy constituents at the oxide/metal interface, metal oxide deposition can occur from saturated coolant water, insoluble material of the porous layer can become resuspended in consequence of the highly turbulent coolant flow, and dissolution/precipitation occurs during cooling and heating cycles. Although general empirical chemical formulae, such as nickel ferrite, can be given to these surface deposits, they are generally very heterogeneous. It will be understood that the occurrence of these corrosion release processes means that a ready source of metal corrosion products, both soluble and insoluble, exists within s reactor primary coolant circuit and ancillary circuits connected thereto. While the reactor is operating, these corrosion products are transported into the reactor core where they become activated by interaction with neutrons. A wide array of radionuclides is thus produced in the primary coolant water of a water cooled reactor, but the following Table lists those of major technological interest.

| Principal gamma-emitting nuclides formed by neutron irradiation from corrosion products in water reactors | | | | | |
|---|---|---|---|---|---|
| Parent Nuclides | Radio-Nuclide | Formation Mechanism | Half-Life | Gamma Emission Energy (MeV) | % Parent Natural Metal |
| $^{50}Cr$ | $^{51}Cr$ | n, γ | 28 d | 0.3 | 4.3 |
| $^{58}Fe$ | $^{59}Fe$ | n, γ | 45 d | 1.1 1.3 | 0.3 |
| $^{58}Ni$ | $^{58}Co$ | n, p | 71 d | 0.8 | 68 |
| $^{64}Zn$ | $^{65}Zn$ | n, γ | 224 d | 1.1 | 49 |
| $^{54}Fe$ | $^{54}Mn$ | n, p | 313 d | 0.8 | 5.8 |
| $^{59}Co$ | $^{60}Co$ | n, γ | 5.28 y | 1.2 1.3 | 100 |

Of these radionuclides, cobalt-60 with its long half-life and powerful gamma emission usually accounts for some 80% of the radiation dose (occupational radiation exposure or ORE) received by PWR operations staff.

After leaving the reactor core, the radioactive corrosion products sorb or deposit on out-of-core alloy oxide films, yielding radiation levels there which may be so high that they are frequently measured in tens of millisieverts per hour. There is evidence that this transport of radioactivity involves both soluble and insoluble species but, whatever the dominant mechanism, it results in a high radiation field on materials and components to which reactor operations staff must have access. It is highly desirable that such radioactive contamination of out-of-core components of the reactor primary coolant water circuit or system (which occurs despite the provision of coolant purification equipment through which water from the reactor primary coolant circuit is constantly circulated during normal operation of the reactor) should be minimised.

Methods for reducing such contamination have already been proposed. U.S. Pat. No. 4,526,626, for example, is directed to a method of reducing such contamination in a PWR by subjecting the primary coolant circuit surfaces, exposed to the coolant water, to an anti-corrosion treatment using chelating agents to build up on such surfaces a corrosion resistant oxide layer containing chromium and iron but substantially free of cobalt and nickel. However, although the corrosion resistant layer so built up may initially be almost free of cobalt, it can prove to have a strong attraction for that element which leads to its becoming progressively more contaminated with the passage of time, due to the unavoidable presence of residual levels of cobalt in the system. Furthermore, the corrosion resistant film so produced suffers, like those resulting from earlier treatment methods referred to in the said patent, from a tendency to flake off the underlying surface and thus fail in its intended function of protecting it against corrosion.

It is an object of the present invention to provide a more convenient and satisfactory method of inhibiting or reducing such contamination, and in particular cobalt contamination, in the primary coolant circuit of a pressurised water cooled reactor.

According to the invention there is provided a method of inhibiting or reducing radioactive contamination of out-of-core components of the primary coolant circuit, containing light water with a boric acid content, of a pressurised light-water-cooled nuclear reactor by radionuclides generated within the core of the reactor by irradiation of metallic impurities dissolved in and carried by the circulating coolant water, the method comprising the steps of providing for continuous removal of such impurities and radionuclides generated therefrom from the coolant water by continuous diversion of a proportion of the cooling water, during normal operation of the reactor at normal operating temperatures and boric acid concentrations of the coolant water, through coolant-water purification equipment associated with the primary coolant circuit, and, prior to a period of such normal operation of the reactor, circulating the coolant water at a lower temperature maintained at a value between 100° and 150° C. and a higher boric acid concentration corresponding to a boron content between 2000 and 6000 ppm through the said out-of-core components during an extended period of time of at least half a day sufficient to reduce the appetite of such components for the said radionuclides before and during subsequent normal operation of the reactor, thereby to increase the relative effectiveness of the coolant water purification equipment in removing such radionuclides during such subsequent normal operation.

The step of circulating the coolant water at lower temperature and higher boric acid concentration than in normal reactor operation may be carried out intermittently (between successive periods of normal operation of the reactor), notably during an approach to reactor shut-down to allow for routine refuelling and maintenance, or during the subsequent return from the shut-down condition to resume normal operation; but an especially favourable time for carrying out this step is during initial commissioning of the reactor (preferably towards the end of the hot functional commissioning period which is when the boric acid injection system is being proved and it could readily be incorporated) before the reactor has been fuelled and thus before its first period of normal operation, thereby to effect removal of impurities from the coolant water before any irradiation thereof has occurred in the reactor core.

Preferably the continuous diversion of coolant water through the coolant-water purification equipment is maintained during the period of circulation at reduced temperature and increased boric acid concentration, as well as during subsequent normal operation of the reactor, since during that period (even though it will be relatively short) the availability of impurities to be removed from the system by the coolant-water purification equipment is much higher than during the subsequent period of normal operation. Nevertheless, during the subsequent period of normal operation the concentration of dissolved impurities available to be scavenged by the purification equipment remains at an enhanced level, due to use of method of the invention, compared with what would otherwise be the case.

Also according to the invention there is provided a method of increasing the concentration of cobalt in the coolant in the primary coolant circuit of a pressurised light-water reactor during normal operation of the reactor, said coolant comprising light water and boric acid which during normal operation is maintained at a concentration corresponding to a boron content no more than 1200 ppm, the method comprising circulating the coolant water, prior to a period of normal operation of the reactor, at a coolant temperature maintained at a value between 100° C. and 150° C. and at a higher boric acid concentration than in normal operation, for an extended period of time of at least half a day so as to dissolve cobalt from surfaces of components forming the circuit, and to reduce the appetite of the said surfaces for cobalt during subsequent normal operations of the reactor.

The invention will be more fully explained and understood by reference to the following description of experiments and investigations carried out in connection therewith.

In a PWR, the primary coolant water (which, as noted above, reaches core outlet temperatures up to 320° C. during normal operation of the reactor) normally contains deliberate additions of lithium hydroxide to control or limit metal corrosion rates, as well as boric acid to control the reactivity of the reactor, and dissolved hydrogen in amounts between 25 and 50 $cm^3/kg$ to control radiolytic breakdown of the coolant water. The concentration of cobalt in the coolant water at such operating temperatures was found experimentally to be minute, no more than 5–10 parts per trillion (ppt) or 5–10 $\mu g$ of cobalt per tonne of coolant water. It was also found (in actual reactors and in an experimental rig simulating a reactor primary coolant circuit but without the associated coolant-water purification equipment) that, as the primary coolant water is allowed to cool, as occurs during the approach to reactor shut-down for maintenance purposes, higher cobalt concentrations are measurable in the coolant water. This gave rise to hopes that the existing coolant-water purification equipment of a PWR primary coolant circuit might be used more effectively during the approach to shut-down, or during start-up, than during normal reactor operation for reducing the cobalt inventory of the primary coolant water and out-of-core parts of the primary coolant circuit. With the chemical conditions of the coolant water, in the experimental rig, adjusted as normal for reactor start-up or approach to shut-down, i.e. a boron concentration of 2000 ppm (parts per million) and less than 0.1 ppm of lithium, and with no hydrogen overpressure but with dissolved oxygen held at 1 ppb (parts per billion) or less by an addition of hydrazine or provision of a nitrogen overpressure, it was found in early experiments that maximum cobalt concentration in the coolant water was obtained at temperatures in the range of 120°–140° C. Doubling the boron concentration to 4000 ppm was found to reduce the optimum temperature to about 100° C. but not to change significantly the maximum concentration of cobalt, which remained at about 5 ppb. It will be noted that this is 500–1000 times as great as the cobalt concentration to be found in the primary coolant water of a PWR in normal operation, and from this it may be supposed that in an actual reactor (as opposed to the experimental rig which lacked coolant-water purification equipment) diversion of coolant water through such equipment during the period of the low-temperature regime will result in a favourably increased rate of scavenging and removal of the cobalt from the coolant water; and the longer the duration of this low-temperature regime, the greater the amount of removed cobalt may be expected to be, though, of course, the maximum available duration will usually be limited by the requirements of other procedures being carried out on or around the reactor at the same time.

The above-outlined results were obtained by means of experiments which involved circulating the borated coolant water round the experimental rig for prolonged periods, at temperatures in a range from about 150° C. down to below 100° C. After completion of these experiments the coolant water temperature was raised to 300° C., the boron and lithium concentrations were adjusted to 1200 ppm and 2.2 ppm respectively and a hydrogen overpressure was provided. It was found that the soluble cobalt concentration remained at an enhanced level which stabilised at about 500 ppt. This contrasted with a normal soluble cobalt concentration of 5–10 ppt which had been observed in the rig for many months prior to the low temperature treatment and which corresponded to normal concentrations of 5–10 ppt which have been consistently observed in actual PWR primary circuit coolants. It followed, therefore, that the low temperature treatment had resulted in an increased soluble cobalt concentration of 50–100 times that normally present in power reactor coolant water at 300° C., and it appears also to follow that if the rig had been provided with the usual coolant-water purification equipment, or in the case of an actual reactor provided with such equipment, diversion of coolant water therethrough during and after the return to normal reactor conditions after the low-temperature treatment would have resulted in a further enhanced removal of cobalt from the coolant circuit.

Further studies then showed that, as circulation of the coolant water in the experimental rig was continued over several months under constant chemistry and temperature conditions corresponding to normal reactor operation, the soluble cobalt concentration decreased very slowly. The explanation for this persistent elevation of the cobalt concentration in the circumstances described appears to be that whereas soluble cobalt at such a relatively high concentration would normally be rapidly captured by the oxide films on the surfaces contacted by the coolant water, in which the cobalt concentration would thus become rapidly reduced, this acquisitive behaviour of the oxide films is inhibited by the treatment to which they have been subjected, namely exposure over a period of time to coolant water at temperature intermediate between those obtaining during reactor operating and, respectively, shutdown conditions and with a boron content higher than would be provided during normal operating conditions of a reactor. It follows that if the oxide films in out-of-core components of a reactor primary coolant circuit are inhibited by similar treatment, then, during subsequent normal operation of the reactor (including circulation of a proportion of the primary coolant water through coolant purification equipment, in normal manner), natural cobalt and radioactive cobalt produced in the core by neutron irradiation of coolant water impurities will be acquired by out-of-core oxide films to a lesser extent, and will remain available to be removed by the purification equipment to a greater extent, than would otherwise be the case. Solely for illustrative purposes, if the soluble cobalt concentration in the coolant water in the primary coolant circuit of a PWR were increased to 500 ppt with a flowrate of 20 tonne/hour through the ion exchange purification beds of the purification equipment, 24 g of cobalt would be removed over a 100 day period of power reactor operation.

Results obtained in a further experiment carried out in the same experimental rig show unexplained differences in detail from the results obtained earlier, but in broad terms show the same effects. In this later experiment, water at 120° C. and containing 4000 ppm of boron was circulated round the rig for two days, after which very high dissolved cobalt levels, approaching 200 ppb, were measured. When the temperature and boron content of the water circulating in the rig were then adjusted to correspond to normal PWR operation, the soluble cobalt concentration reduced to 150 ppt and then to 50 ppt over a period of 3–4 days. Thus, compared with the earlier results, a very substantially higher maximum cobalt concentration was then followed by a much steeper fall over a much shorter period; but the final cobalt concentration was still greater, by a factor of 5–10, than the concentration which is found, under normal reactor operating conditions, if the coolant water and the oxide-covered surfaces in contact with it are not subjected to the low temperature high-boron treatment. If a similar response to the low-temperature high-boron treatment were obtained in an actual PWR in which the elevated dissolved cobalt levels would lead to increased removal of cobalt by the coolant-water purification equipment, the total removal of cobalt, integrated over the period during and after the treatment, could amount to up to 200 g of cobalt.

The only possible source of cobalt to account for the increased dissolved cobalt levels in the above-described experiments was the oxide film which covers the rig internal surfaces exposed to the water, and further laboratory investigations using the technique of secondary ion mass spectrometry (SIMS) analysis have confirmed that the low-temperature high boric acid treatment which forms the basis of the invention does indeed result in increased dissolution of cobalt, nickel and iron from established oxide films on the water-exposed internal surfaces both of the experimental rig and of the primary coolant circuit of a PWR. It is found that dissolution of these cations is not confined to the outermost layer of the oxide but persists down to depths of several hundred nanometers. Since chromium is not dissolved, the residual oxide shows an increase in its chromium to cobalt, chromium to nickel and chromium to iron ratios; and this agrees with the findings that the soluble levels not only of cobalt but also of nickel and iron in the coolant water in the experimental rig were all much higher after the low-temperature boric acid treatment had been carried out than before. The residual oxide film, after such increased dissolution from it of cobalt, nickel and iron, is in an unstable state from which, once standard physico-chemical coolant conditions have been restored, it tends to restabilise by re-absorbing cobalt, nickel and iron. Such re-absorption is found, however, to be relatively slow; it appears to be inhibited by changes produced in the form of the film during its depletion. In consequence, a relatively high dissolved cobalt level persists for a considerable period after the low temperature treatment has ceased, and allows cobalt removal by the coolant-water purification equipment of a reactor to be continued at a useful rate for a correspondingly long period during normal operation of the reactor.

Recapitulating, therefore, the invention provides a method of inhibiting or reducing contamination, in the primary coolant circuit of a water-cooled nuclear reactor, of out-of-core components of such circuit by radionuclides generated by irradiation within the reactor core of metallic impurities dissolved in and carried by the coolant, the method comprising the steps of providing for continuous removal of such radionuclides or their predecessors from the coolant by continuous diversion of a proportion of the coolant through purification equipment associated with the coolant circuit during normal operation of the reactor at normal operating temperatures and boric acid concentrations of the coolant, intermittently (between periods of such normal operation of the reactor) or earlier (during commissioning) reducing the cobalt absorption properties of the reactor with the temperature of the coolant reduced and the boric acid concentration thereof increased, and maintaining circulation of the coolant at its reduced temperature and increased boric acid concentration through the said out-of-core components during an extended period of time prior to resuming normal operation of the reactor.

At least in the case of a PWR in which, during normal operation, the primary coolant water has a boric acid concentration in the vicinity of 1200 ppm at start of cycle and leaves the reactor core at temperatures close to 320° C., it is preferred that in carrying out the method of the invention the coolant temperature is reduced into the range 100°-150° C. and its boric acid concentration is increased to 2000 ppm or more, and these conditions are maintained for a period of preferably greater than twelve hours if that does not conflict excessively with other criteria for operation of the reactor. Boric acid concentrations of 4000 ppm have been referred to above, and it will be understood that the use of even higher levels, up to say 6000 ppm, can be contemplated.

Conveniently and advantageously, the method according to the invention can be carried out towards the end of the hot functional commissioning period (which is when the boric acid injection system is being proved) before any activation of cobalt takes place, or in conjunction with routine or other necessary shut-downs of the reactor for maintenance or other purposes. During a normal shutdown or start-up of a PWR, the primary coolant usually passes through the temperature range 120°-140° C. in less than an hour, which is insufficient to produce in any significant degree the contamination-inhibition which the invention is able to confer. However, the method of the invention can in practice be carried out, during an approach to reactor shutdown or during subsequent start-up, by providing a "hold" in the process, i.e. deliberately extending to an adequate length the period during which the coolant temperature and boric acid concentration remain within their respective suitable ranges.

The inhibition of the appetite for cobalt and other radioactive impurities, of the oxide films within out-of-core components of the primary coolant circuit, which results from treatment by the method of the invention, and the persistence of that inhibition after normal operation of reactor has been resumed, means that during such resumed normal operation the proportion of irradiation-induced radioactive impurities which is captured by the continuously-operating purification system instead of by oxide films within the out-of-core components of the coolant circuit is much increased and that, correspondingly, the rate at which such out-of-core components become radioactively contaminated, and the equilibrium contamination level thereof, are much reduced. Because of the persistence of the inhibiting effect, the improved preferential removal of contamination or its source by the purification equipment remains effective over prolonged periods of normal operation of the reactor and may well persist in large measure until the next shutdown of the reactor (when the absorption-inhibiting effect is boosted by a further application of the method according to the invention).

The reduced contamination of out-of-core coolant circuit components which can be achieved by means of the invention, and the resulting benefits in terms of reduced occupational doses, less stringently limited personnel access and consequent easier maintenance, will, it is believed, easily outweigh the costs and inconvenience of any delay in achieving reactor shutdown or start-up in order to incorporate a concurrent treatment by the method of the invention.

I claim:

1. A method of inhibiting or reducing radioactive contamination of out-of-core components of the primary coolant circuit, containing light water with a boric acid content, of a pressurized light-water-cooled nuclear reactor by radionuclides generated within the core of the reactor by irradiation of metallic impurities dissolved in and carried out by the circulating coolant water, the method comprising the steps of providing for continuous removal of such impurities and radionuclides generated therefrom from the coolant water by continuous diversion of a proportion of the coolant water, during normal operation of the reactor at normal operating temperatures and boric acid concentrations of the coolant water, through coolant water purification equipment associated with the primary coolant circuit, and, prior to a period of such normal operation of the reactor, circulating the coolant water at a lower temperature maintained at a value between 100° and 150° C. and a higher boric acid concentration corresponding to a boron content between 2000 and 6000 ppm through the said out-of-core components during an extended period of time of at least half a day sufficient to reduce the appetite of such components for the said radionuclides before and during subsequent normal operation of the reactor, thereby to increase the relative effectiveness of the coolant water purification equipment in removing such radionuclidess during such subsequent normal operation.

2. A method as claimed in claim 1 and including the step of continuously diverting a proportion of the coolant water through the said purification equipment simultaneously while circulating it at the said lower temperature and higher boric acid concentration during the said extended period of time.

3. A method as claimed in claim 2 and carried out during initial commissioning of the reactor, before fuelling thereof and before the first period of normal operation thereof, thereby to effect removal of impurities from the coolant water before any irradiation thereof has occurred in the reactor core.

4. A method as claimed in claim 1, wherein the said extended period during which the coolant water is circulated at lower temperature and higher boric acid concentration than normal is a period between two successive periods of normal operation of the reactor.

5. A method as claimed in claim 4, wherein the said extended period is achieved during transition in either direction between reactor shutdown condition and normal reactor operational condition, by deliberately extending to adequate length the period during such transition during which the temperature and boric acid concentration of the coolant water are maintained within suitable ranges respectively lower and higher than those pertaining to normal reactor operation.

6. A method as claimed in claim 1, wherein the duration of the extended period of time is at least two days.

7. A method of increasing the concentration of cobalt in the coolant in the primary coolant circuit of a pressurised light-water reactor during normal operation of the reactor, said coolant comprising light water and boric acid which during normal operation is maintained at a concentration corresponding to a boron content no more than 1200 ppm, the method comprising circulating the coolant water, prior to a period of normal operation of the reactor, at a coolant temperature maintained at a value between 100° C. and 150° C. and at a higher boric acid concentration than in normal operation, for an extended period of time of at least half a day so a to dissolve cobalt from surfaces of components forming the circuit, and to reduce the appetite of the said surfaces for cobalt during subsequent normal operation of the reactor.

8. A method as claimed in claim 7, applied to a reactor in which during normal operation the primary coolant water is heated to at least 300° C. and is maintained at a boric acid concentration corresponding to a boron content of 1200 ppm or less, wherein during the said extended period the coolant temperature is maintained at a lower value in the range of approximately 140° to 100° C. and the boric acid concentration is maintained at a higher level corresponding to a boron content in a range of approximately 2000 to 6000 ppm.

9. A method as claimed in claim 8 wherein the duration of the extended period of time is at least two days.

* * * * *